(12) United States Patent
Dotzler et al.

(10) Patent No.: US 11,846,315 B2
(45) Date of Patent: Dec. 19, 2023

(54) CONTROL ELEMENT

(71) Applicant: GRAMMER AG, Ursensollen (DE)

(72) Inventors: Florian Dotzler, Hirschau (DE); Florian Schanderl, Schwarzenfeld (DE)

(73) Assignee: GRAMMER AG, Ursensollen (DE)

(*) Notice: Subject to any disclaimer, the term of this patent is extended or adjusted under 35 U.S.C. 154(b) by 505 days.

(21) Appl. No.: 17/124,722

(22) Filed: Dec. 17, 2020

(65) Prior Publication Data

US 2021/0190130 A1   Jun. 24, 2021

(30) Foreign Application Priority Data

Dec. 19, 2019  (DE) .......................... 102019135070.0

(51) Int. Cl.
*F16C 1/18* (2006.01)
*B60N 2/90* (2018.01)
(Continued)

(52) U.S. Cl.
CPC .................. *F16C 1/18* (2013.01); *B60N 2/02* (2013.01); *B60N 2/919* (2018.02); *G05G 5/12* (2013.01); *B60N 2002/952* (2018.02)

(58) Field of Classification Search
CPC ... G05G 5/18; G05G 5/24; G05G 5/12; B60N 2/02; B60N 2/919; B60N 2/933;
(Continued)

(56) References Cited

U.S. PATENT DOCUMENTS 4,834,333 A * 5/1989 Saito ...................... B60N 2/165
                                                         297/344.14
5,662,000 A * 9/1997 Patterson ............... B62K 21/26
                                                         74/473.26
(Continued)

FOREIGN PATENT DOCUMENTS

DE    102011014234    9/2012
WO   WO 2020/074684   4/2020

OTHER PUBLICATIONS

EPO Machine Translation of the Description of DE 102011014234 A1, Schneider et al., Sep. 20, 2012. (Year: 2023).*

(Continued)

*Primary Examiner* — Daniel D Yabut
(74) *Attorney, Agent, or Firm* — Sheridan Ross P.C.

(57) ABSTRACT

The invention relates to a control element, in particular for a vehicle seat, comprising a second element which is arranged to be movable relative to a first element, wherein the second element is connected to a Bowden cable and is lockable relative to the first element, wherein the control element comprises a spring element, on which a first latching element is provided, wherein the first latching element presses against a second latching element through the spring force of the spring element, whereby the first latching element and the second latching element latch, wherein the first element and the spring element are formed in one piece and the second latching element is arranged on the second element, or the second element and the spring element are formed in one piece and the second latching element is arranged on the first element.

20 Claims, 8 Drawing Sheets

(51) Int. Cl.
 *B60N 2/02* (2006.01)
 *G05G 5/12* (2006.01)
(58) Field of Classification Search
 CPC ...... B60N 2/943; B60N 2/169; B60N 2/1685;
   B60N 2002/952; F16C 1/18; F16F 1/182;
   Y10T 74/20438; Y10T 74/2138; Y10T
   74/20684
 See application file for complete search history.

(56) References Cited

U.S. PATENT DOCUMENTS

| | | | | |
|---|---|---|---|---|
| 5,676,020 A | * | 10/1997 | Jordan | B62K 23/04 |
| | | | | 74/567 |
| 5,921,140 A | * | 7/1999 | Lemmens | B62K 23/04 |
| | | | | 74/489 |
| 6,092,902 A | * | 7/2000 | Weber | G05G 1/105 |
| | | | | 362/23.17 |

OTHER PUBLICATIONS

Extended Search Report for European Patent Application No. 20000448.9, dated Apr. 9, 2021, 6 pages.
Official Action (with English translation) for China Patent Application No. 202011520617.8, dated Sep. 5, 2022, 12 pages.
Official Action for Europe Patent Application No. 20000448.9, dated May 8, 2023, 9 pages.
Official Action for German Patent Application No. 102019135070.0, dated Aug. 28, 2020, 6 pages.

* cited by examiner

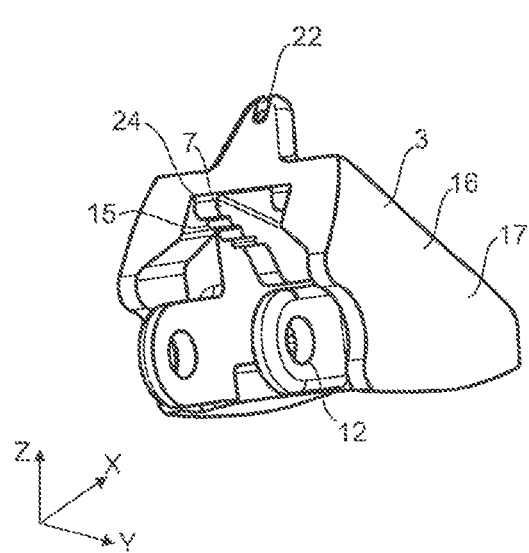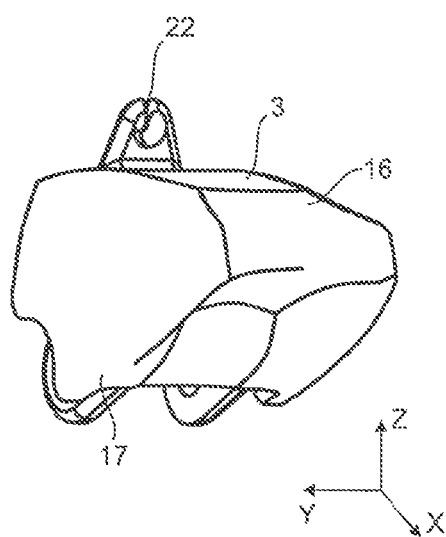
Fig. 4a  Fig. 4b
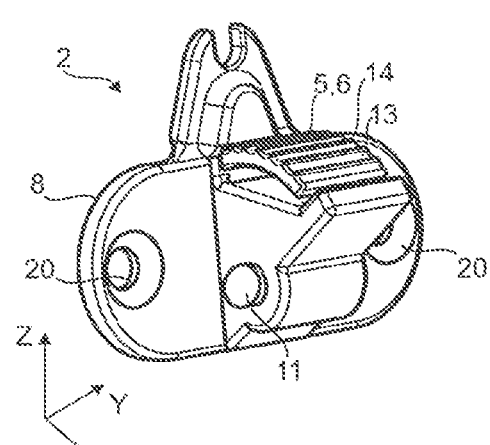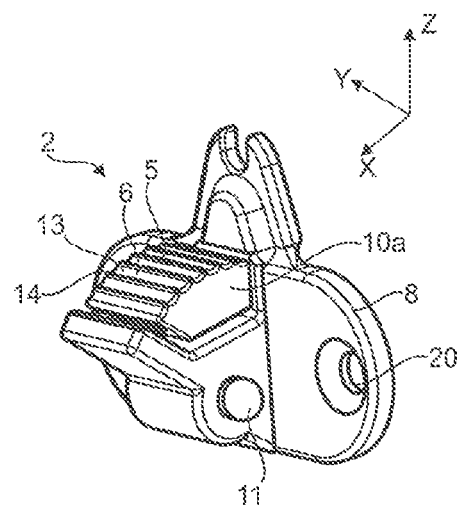
Fig. 5a  Fig. 5b
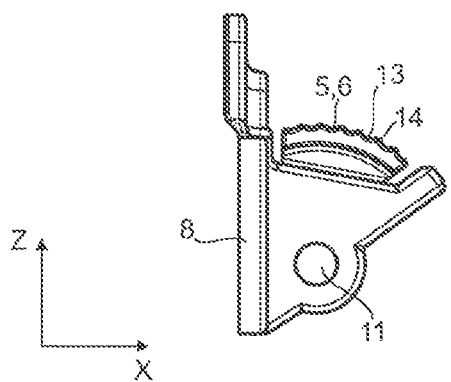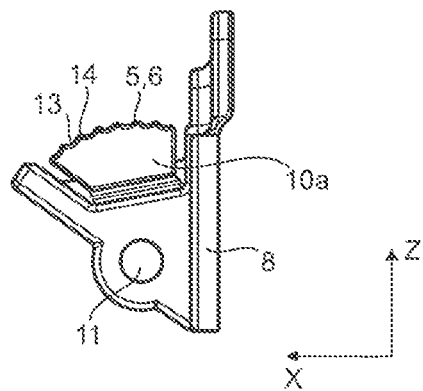
Fig. 6a  Fig. 6b

CONTROL ELEMENT

CROSS-REFERENCE TO RELATED APPLICATION

This application claims the benefit of German Patent Application No. 10 2019 135 070.0, filed Dec. 19, 2019, the entire contents of which are incorporated herein by reference.

FIELD

The invention relates to a control element, in particular for a vehicle seat, comprising a second element which is movable relative to a first element, wherein the movement of the second element actuates a Bowden cable, wherein the movement of the second element is lockable by a latching apparatus.

BACKGROUND

A vehicle seat has a large number of components by means of which so-called seat parameters can be set. The occupant should be able to modify the respective seat parameters and adapt them to his needs. Such seat components can be, for example, spring and/or damping systems. The corresponding seat parameters to be modified would be, for example, the spring stiffness or the damper stiffness. Further seat parameters can be, for example, the inclination of the backrest or the seat height. Appropriate devices are provided for setting these parameters.

As a rule, such components or devices cannot be operated directly by the user. Accordingly, it is desirable that a control element is provided which is arranged on the vehicle seat at a location that is easily accessible for the occupant. A Bowden cable can be provided for the transmission of a movement of the control element or corresponding forces. Currently known control elements for Bowden cable systems comprise a large number of components and are therefore complex to produce. Furthermore, with the known control elements, material fatigue often occurs due to frequent use, which makes the control elements unusable.

SUMMARY

The object of the present invention is to provide a control element which overcomes the stated disadvantages. A further object of the invention is to provide a vehicle seat having a control element which overcomes the stated disadvantages.

This object is achieved by a control element, in particular for a vehicle seat, comprising a second element which is arranged to be movable relative to a first element, wherein the second element is connected to a Bowden cable and is lockable relative to the first element, wherein the control element comprises a spring element, on which a first latching element is provided, wherein the first latching element presses against a second latching element through the spring force of the spring element, whereby the first latching element and the second latching element latch, wherein the first element and the spring element are formed in one piece and the second latching element is arranged on the second element, or the second element and the spring element are formed in one piece and the second latching element is arranged on the first element.

The Bowden cable is accordingly actuated by the movement of the second element relative to the first element. The Bowden cable is preferably connected to a corresponding component of the vehicle seat or a corresponding device of the vehicle seat. The movement of the second element or the corresponding tensile or compressive force can be transmitted to the component or device by the Bowden cable. The occupant can thus manipulate the component or device and adapt the vehicle seat to his needs. By latching the first latching element with the second latching element, or the first element with the second element, the second element can be locked or fixed at a specific position. The setting of the component or the device corresponding to this position can therefore advantageously also be established.

According to a first variant, the first element and the spring element are formed in one piece, the second latching element is furthermore arranged on the second element. The control element according to the invention has the advantage that the first element is formed in one piece with the spring element. The first element is preferably made from a single unitary piece. It is therefore extremely simple and inexpensive to produce.

In the first variant, the second element and the second latching element are preferably also formed in one piece. An integral configuration of the second element and the second latching element would also be conceivable. "Integral configuration" is understood to mean that, although the elements are not made from a single unitary piece, they are not only firmly connected, but are so intimately connected to one another that they do not appear as a plurality of joined components and, in any case, can no longer be released from one another.

According to a second variant, the second element and the spring element are designed in one piece, the second latching element is furthermore arranged on the first element. The control element according to the invention also has the advantage here that the second element is formed in one piece with the spring element. The second element is preferably made from a single unitary piece. It is therefore extremely simple and inexpensive to produce.

In the second variant, the first element and the second latching element are preferably also formed in one piece. An integral configuration of the first element and the second latching element would also be conceivable. "Integral configuration" is understood to mean that, although the elements are not made from a single unitary piece, they are not only firmly connected, but are so intimately connected to one another that they do not appear as a plurality of joined components and, in any case, can no longer be released from one another.

The basic function of operating the Bowden cable can therefore be carried out by just two elements. This allows a considerably simple and inexpensive production of the control element.

According to a preferred embodiment, the first element has a plate-like base portion, by means of which the first element can be arranged on the vehicle seat. This can be done for example via a screw connection. However, other connections such as snap connections, rivet connections or similar connections would also be conceivable. A through opening for the Bowden cable is advantageously provided on the plate-like base portion. Accordingly, the Bowden cable can advantageously be guided through the first element to the second element.

According to a further preferred embodiment, the first element and the spring element consist of a plastics material. The first element and the spring element are preferably made of the same plastics material. The first element and the spring element are preferably produced by an injection moulding process. The one-piece configuration of the first element and spring element can be done extremely easily through the advantageous use of the injection moulding process. The plastics material from which the first element and the spring element are produced is preferably a plastics material suitable for an injection moulding process. The second element and the second latching element are also advantageously produced by an injection moulding process. The second element and the second latching element are preferably made of a preferably identical plastics material. In this way, the one-piece configuration according to the first variant is advantageously implemented. According to the second variant, it is advantageous that the second element and the spring element consist of a plastics material. The second element and the spring element are preferably made of the same plastics material. The second element and the spring element are preferably produced by an injection moulding process. The first element and the second latching element are also advantageously produced by an injection moulding process. The first element and the second latching element are preferably made of a preferably identical plastics material.

According to a further particularly preferred embodiment, the spring element is a curved spiral spring and/or leaf spring. The spring element preferably has at least two arcs of curvature. The spring element advantageously has two arcs of curvature. The spring element or the curved spiral spring and/or leaf spring preferably has an S-shaped profile. Each sub-portion of the spring element which has an arc of curvature can preferably be regarded as a sub-spring. These sub-springs can preferably be viewed as being connected in series. A resulting spring constant or the spring stiffness (circle) for sub-springs connected in series is calculated as follows:

$$\frac{1}{K_{res}} = \sum_{i=1}^{n} \frac{1}{K_i}$$

Accordingly, the spring stiffness is reduced in the case of sub-springs connected in series. The latching of the second element relative to the first element, or the latching of the second element to the first element should advantageously be sufficiently stable to withstand external mechanical loads, but it should also be easily releasable by the occupant in order to perform a corresponding modification. Accordingly, it is advantageous to provide a spring element with a lower spring stiffness. This can be achieved, for example, by reducing the material thickness. However, such a reduction in material thickness has a negative effect on the service life of the spring element. Due to the advantageous configuration of the spring element with at least two arcs of curvature, or with two arcs of curvature and an S-shaped profile, the resulting spring stiffness can be reduced and at the same time a sufficient material thickness of the spring element can be provided. Material fatigue is thus prevented in the spring element and adequate stability is ensured. The spring element or the control element thus has a longer service life.

According to a further advantageous embodiment, the second element is arranged on the first element to be rotatable about an axis of rotation. The axis of rotation preferably extends along a horizontal axis Y. The axis of rotation advantageously runs along a vertical axis Z under the first latching element. Preferably, two guide projections are arranged on the first element, each of which is arranged in a receptacle on the second element. The guide projections preferably extend along the horizontal axis Y. The guide projections are preferably arranged on opposite side surfaces of the first element and thus extend in each case in the opposite direction along the horizontal axis Y. The receptacles can preferably be designed as recesses or bores. The guide projections and the receptacles are advantageously dimensioned in such a way that the second element can be rotated relative to the first element and the second element is arranged or attached on the first element in a captive manner. The Bowden cable is preferably attached to the second element in such a way that an inner cable of the Bowden cable is moved by the rotary movement. A Bowden cable advantageously comprises an inner cable which runs in a flexible but pressure-resistant cable casing in the direction of pull. Such a cable casing is used to guide the inner cable and as a counter bearing to support the tensile forces to be transmitted.

According to a further preferred embodiment, the first latching element has a plurality of latching grooves. The first latching element preferably has a convex curvature along the vertical axis Z. The latching grooves are preferably separated by latching steps.

According to a further preferred embodiment, the second latching element has at least one latching cam. The second latching element preferably has at least two latching cams. The second latching element further preferably has at least three latching cams. The at least one latching cam preferably engages in a latching groove or in a first subset of latching grooves. Due to the advantageous contact of the second element on the first element, the spring element is compressed so that a certain preload between the first element and the second element, or between the first latching element and the second latching element, or between the at least one latching cam and a subset of latching grooves predominates. The first latching element is thus pressed against the second latching element by the spring force of the spring element. The at least one latching cam preferably runs along the horizontal axis (Y). It is also advantageous if the at least one latching cam extends parallel to the latching grooves.

The engagement of the at least one latching cam is advantageously releasable from the first subset of latching grooves by a rotary movement of the second element about the axis of rotation and is displaceable to a second subset of latching grooves. In the case of such an advantageous rotary movement, sufficient adjusting force is applied that the at least one latching cam from the first subset of latching grooves can slide over the corresponding latching step or latching steps. Accordingly, a compression of the spring element is advantageously caused, as a result of which the first latching element is displaced downward along the vertical axis Z. The necessary adjusting force is therefore preferably defined by the preload between the first latching element and the second latching element and the height of the latching steps. The advantageous configuration of the spring element with at least two or two arcs of curvature ensures that, when the spring element is compressed, tilting along the horizontal axis (Y) of the first latching element is prevented. Such an advantageous compression of the spring element advantageously takes place both in the first variant and in the second variant.

According to a preferred embodiment, the first latching element and the second latching element are aligned parallel along the horizontal axis (Y) both in an engaged position and in a released position. The second latching element advantageously extends in width along the horizontal axis Y. Due to the parallel alignment of the two latching elements in an engaged position, the second latching element preferably rests against the first latching element along its entire width. Preferably, the at least one latching cam and the first subset of latching grooves are aligned parallel along the horizontal axis (Y) both in an engaged position and in a released position. Due to the parallel alignment of the latching cam and the first subset of latching grooves, the at least one latching cam preferably rests against the first subset of latching grooves in an engaged position along its entire width. Advantageously, the parallel alignment of the latching elements is established by the advantageous configuration of the spring element with at least two arcs of curvature, preferably two arcs of curvature and a corresponding S-shaped profile of the spring element both in an engaged position and in a released position. Such a shape of the spring element can ensure that the first latching element is pressed against the second latching element along its entire width. With a corresponding advantageous compression of the spring element, the first latching element is not tilted relative to the second latching element. In the case of a conventional spring with only one arc of curvature, the first latching element would be tilted if the individual latching steps are skipped and the spring element is compressed. Here, the two latching elements would no longer rest against one another over their full width. This would cause one-sided wear of the latching elements.

Preferably, haptic and/or acoustic feedback can be specified by the height of the latching steps. Comparatively high latching steps cause greater compression of the spring element or greater displacement of the first latching element along the vertical axis (Z). The sliding of the at least one latching cam over higher latching steps can advantageously be perceived acoustically, for example as a loud click. A corresponding haptic sensation when sliding the latching cam is therefore advantageously also given. If the latching steps have a lower height, acoustic or haptic feedback is correspondingly less pronounced.

The haptic and/or acoustic feedback is significantly enhanced by the described advantageous parallel alignment of the first latching element and the second latching element along the horizontal axis (Y). This is due to the fact that the contact surface is enlarged along the horizontal direction (Y9).

It would be conceivable here for the latching steps to have different heights and thus to make different latching positions recognisable for the user. In this way, an advantageous displacement path of the second latching element along the first latching element can be divided into discrete regions, for example, which are identified by elevated latching steps. It would also be possible for a predetermined end portion of the displacement path to be identified by means of elevated latching steps.

According to a further preferred embodiment, the second element comprises a cap-like portion which at least in portions encloses the first latching element and the spring element. The second latching element is preferably arranged at least in portions on an inner surface of the cap-like portion. At least one gripping surface, preferably a plurality of gripping surfaces, is preferably provided on the cap-like portion. In such an advantageous configuration, the control element consists of only two elements.

The user can advantageously grip the second element on this at least one gripping surface and move it accordingly. The shape of the gripping surfaces can be designed in such a way that the user can easily apply the required force. The shape of the gripping surfaces can be designed depending on the position of the control element on the vehicle seat. Depending on the position of the control element on the vehicle seat, the usual direction of grip of the occupant towards the control element also changes.

Haptic coatings and/or protective coatings are advantageously applied to the at least one gripping surface of the cap-like portion. Such coatings can be structured coatings that influence the haptic experience. With such coatings, the at least one gripping surface of the cap-like portion can be designed to be insensitive to mechanical loads such as impacts or heat, acids, etc. The at least one gripping surface of the cap-like portion can have a textile character, a soft leather structure. The at least one gripping surface of the cap-like portion can also appear velvety, matt, soft or with a pearl structure. Further haptic elements such as grip linings, rubber coatings and the like can preferably be arranged on the at least one gripping surface of the cap-like portion. The at least one gripping surface of the cap-like portion can also have different colours. Furthermore, identification elements can preferably be provided on the at least one gripping surface of the cap-like portion. Such identification elements can be tactile elements or symbols or visual symbols which indicate the function of the control element. Furthermore, it would be possible for luminescent or luminous elements to be arranged on the at least one gripping surface of the cap-like portion, which elements improve the findability of the control element or provide an indication of the function of the control element.

According to a further preferred embodiment, a grip cap can be arranged on the second element. The second element preferably comprises a lever arm extending from the axis of rotation. The grip cap can preferably be arranged on the lever arm. Preferably, at least one gripping surface is provided on the grip cap. Such an advantageous embodiment consists of only three elements, wherein only the first and the second element are necessary for the function of the control element. The grip cap is advantageously used for the special customer-specific configuration of the appearance of the control element or its gripping surfaces. During production, the first and the second element can advantageously be produced identically for each embodiment. Depending on the particular purpose or the customer's request, the second element can be equipped with a specially designed grip cap.

The user can advantageously grip the at least one gripping surface of the grip cap and move the second element. The shape of the gripping surfaces can be designed in such a way that the user can easily apply the required force. The shape of the gripping surfaces can be designed depending on the position of the control element on the vehicle seat. Depending on the position of the control element on the vehicle seat, the usual direction of grip of the occupant towards the control element also changes.

Haptic coatings and/or protective coatings are advantageously applied to the at least one gripping surface of the grip cap. Such coatings can be structured coatings that influence the haptic experience. The at least one gripping surface of the grip cap can be designed to be insensitive to mechanical loads, such as impacts or heat, acids, etc., by means of such coatings. The at least one gripping surface of the grip cap can have a textile character, a soft leather structure. The at least one gripping surface of the grip cap can also appear velvety, matt, soft or with a pearl structure. Further haptic elements such as grip linings, rubber coatings and the like can preferably be arranged on the at least one gripping surface of the grip cap. The at least one gripping surface of the grip cap can also have different colours. Furthermore, identification elements can preferably be provided on the at least one gripping surface of the grip cap. Such identification elements can be tactile elements or symbols or visual symbols which indicate the function of the control element. Furthermore, it would be possible for luminescent or luminous elements to be arranged on the at least one gripping surface of the grip cap, which elements improve the findability of the control element or provide an indication of the function of the control element.

The object is also achieved by a vehicle seat comprising a control element according to one of the previously described embodiments.

The vehicle seat can be equipped with all the features already described above in the scope of the control element individually or in combination with each other and vice-versa.

The vehicle seat preferably comprises components and/or devices which can be operated with the control element. Seat parameters can preferably be modified by such components and/or devices. Such seat parameters are, for example, the inclination of the backrest or the seat height, the damper stiffness and/or the spring stiffness of a spring and/or damping device for vertical and/or horizontal vibrations.

BRIEF DESCRIPTION OF THE DRAWINGS

Further advantages, aims and characteristics of the present invention are explained with reference to the following description of the attached drawings. Similar components may have the same reference signs in the various embodiments.

In the drawings:

FIG. 4a is a rear view of the second element according to an embodiment;

FIG. 4b is a front view of the second element according to an embodiment;

FIG. 5a is a side isometric view of the first element according to an embodiment;

FIG. 5b is a side view of the first element according to an embodiment;

FIG. 6a is a side view of the first element according to an embodiment;

FIG. 6b is a side isometric view of the first element according to an embodiment;

DETAILED DESCRIPTION

Figure 1:
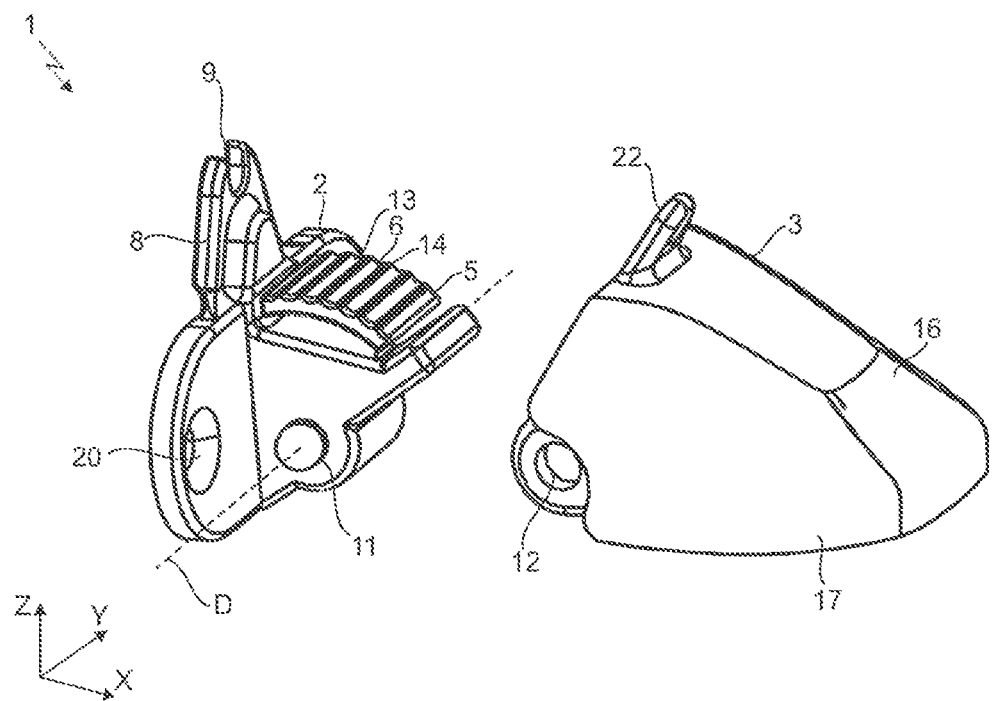
FIG. 1 is an isometric view of a control element according to an embodiment.

In FIGS. 1 to 15c a, control element 1 is shown, in particular for a vehicle seat 100, comprising a second element 3, which is arranged to be movable relative to a first element 2, wherein the second element 3 is connected to a Bowden cable 4 and is lockable relative to the first element 2, wherein the control element 1 comprises a spring element 5 on which a first latching element 6 is provided, wherein the first latching element 6 presses against a second latching element 7 through the spring force of the spring element 5, whereby the first latching element 6 and the second latching element 7 latch, wherein the first element 2 and the spring element 5 are formed in one piece and the second latching element 7 is arranged on the second element 3, or the second element 3 and the spring element 5 are formed in one piece and the second latching element 7 is arranged on the first element 2.

The control element 1 extends along a vertical axis Z, a longitudinal axis X and a horizontal axis Y.

According to a first variant, the first element 2 and the spring element 5 are formed in one piece with the first latching element 6 and the second latching element 7 is also arranged on the second element 3. The second element 3 and the second latching element 7 can also be designed in one piece or integrally. The first element 2 and the spring element 5 can be produced from one, preferably the same plastics material by an injection moulding process. Likewise, the second element 3 and the second latching element 7 can advantageously be produced from one, preferably the same plastics material by an injection moulding process.

According to a second variant, the second element 3 and the spring element 5 are formed in one piece with the first latching element 6. The second latching element 7 is also arranged on the first element 2. The first element 2 and the second latching element 7 can also be designed in one piece or integrally. The second element 3 and the spring element 5 with the first latching element 6 can be produced from one, preferably the same, plastics material by an injection moulding process. Likewise, the first element 2 and the second latching element 7 can advantageously be produced from one, preferably the same, plastics material by an injection moulding process.

FIGS. 1 to 16 show the first variant. The functioning of the second variant is, however, to be understood analogously to the first variant.

The first element 2 has a plate-like base portion 8, by means of which the first element 2 can be arranged on the vehicle seat 100. This can be done in a number of ways. The embodiments according to FIGS. 1 to 10c have bores 20 for this purpose. According to the embodiments according to FIGS. 11 to 15c, a hook-like element 21 is provided which can engage with corresponding apparatuses on the vehicle seat 100.

A through opening 9 for the Bowden cable 4 is provided on the plate-like base portion 8. A receptacle 22 is provided on the second element 3, to which the Bowden cable 4, in particular the inner cable of the Bowden cable, can be attached. The cable casing of the Bowden cable can advantageously be attached in the through opening 9, so that a movement of the second element 3 relative to the first element 2 results in a movement of the inner cable relative to the cable casing. However, the cable casing can also be fixed to the vehicle seat in some other way. The Bowden cable 4 is only indicated in FIGS. 3b and 11; it is not shown in the other drawings for reasons of clarity.

The spring element 5 is a curved leaf spring, which has two arcs of curvature 10a, 10b and an S-shaped profile. Embodiments with more than two arcs of curvature 10a, 10b would of course also be conceivable. The S-shaped profile of the spring element 5 can be clearly seen in FIG. 8. The spring element 5 comprises a lower portion 10c, to which a lower arc of curvature 10b connects along the vertical direction Z. An arm 10d, which extends along the horizontal axis Y, connects to this arc of curvature 10b. The arm 10d merges into the upper arc of curvature 10a, which in turn merges into the first latching element 6. The upper arc of curvature 10a can also be seen in FIGS. 5b and 6b. The spring element 5 can accordingly be viewed as a series connection of sub-springs. The reciprocally resulting spring stiffness is the sum of the reciprocal spring stiffnesses of the sub-springs. The material thickness of the leaf spring or the height of the leaf spring and the type of material or plastics material indicate the respective spring stiffnesses of the sub-springs. By the series connection of the sub-springs, the resulting spring stiffness can be reduced without the material thickness having to be reduced. This has the advantage that the spring element is more durable, which reduces the likelihood of material fatigue.

The second element 3 is arranged on the first element 2 such that it can rotate about an axis of rotation (D). The axis of rotation D extends along the horizontal axis Y. Furthermore, the axis of rotation D runs along a vertical axis Z below the first latching element 6. In this case, two guide projections 11 are arranged on the first element 2, which are arranged on opposite side surfaces of the first element and thus extend in each case in the opposite direction along the horizontal axis Y. These guide projections 11 are each arranged in a receptacle 12 on the second element 3 such that the second element 6 can be rotated relative to the first element 2. Furthermore, the second element 3 is arranged on the first element 2 in such a way that it is compressed by the spring element 5. As a result, the first latching element 5 and the second latching element 6 press against one another due to the spring force of the spring element 5 and are thus preloaded.

The first latching element 6 has a plurality of latching grooves 13. The latching grooves 6 are separated by latching steps 14. Furthermore, the first latching element 6 has a convex curvature along the vertical axis Z, wherein the latching grooves 6 are separated by latching steps 14. The second latching element 7 is accordingly arranged on the second element 3 in such a way that it extends towards the first latching element 5. The second latching element 7 is advantageously designed in one piece with the second element 3. An integral configuration would also be conceivable. The second latching element 7 comprises at least one latching cam 15.

In the latching grooves 6, or in a subset of the latching grooves 6, at least one latching cam 15 engages due to the aforementioned preload. By the rotary movement of the second element 3 relative to the first element 2, a force is applied which causes a sliding of at least one latching cam 15 over the corresponding latching step 14 or over further following latching steps 14. The engagement of the at least one latching cam 15 in a first subset of latching grooves 13 is accordingly releasable by the rotary movement. After the completed rotary movement, the at least one latching cam 15 is displaced to a further subset of the latching grooves 13 and now engages in them. The height of the latching steps 14 can be provided such that a haptic and/or acoustic feedback can be specified. The individual latching steps 14 of the first latching element 2 can also have different heights in order to make certain regions of the displacement path along the first latching element 2 recognisable for the user.

The inner cable of the Bowden cable 4 is moved by the rotary movement. This movement or force can then operate a corresponding component or device of the vehicle seat 100, whereby the corresponding seat parameters can be set.

Both in an engaged position and in a released position, the first latching element 5 and the second latching element 6 are aligned parallel along the horizontal axis Y. Accordingly, the at least one latching cam 15 and the first subset of latching grooves 13 are also aligned parallel along the horizontal axis Y both in an engaged position and in a released position. Due to the parallel alignment of the two latching elements 5, 6, the second latching element 6 rests against the first latching element 5 in an engaged position along its entire width.

The parallel alignment of the latching elements 5, 6 both in an engaged position and in a released position is due to the advantageous configuration of the spring element 5 with at least two arcs of curvature, preferably two arcs of curvature and a corresponding S-shaped profile of the spring element 5. Such a shape of the spring element 5 can ensure that the first latching element 5 is pressed against the second latching element 6 along its entire width. With a corresponding advantageous compression of the spring element 5, the first latching element 5 is not tilted relative to the second latching element 6.

Figure 2:
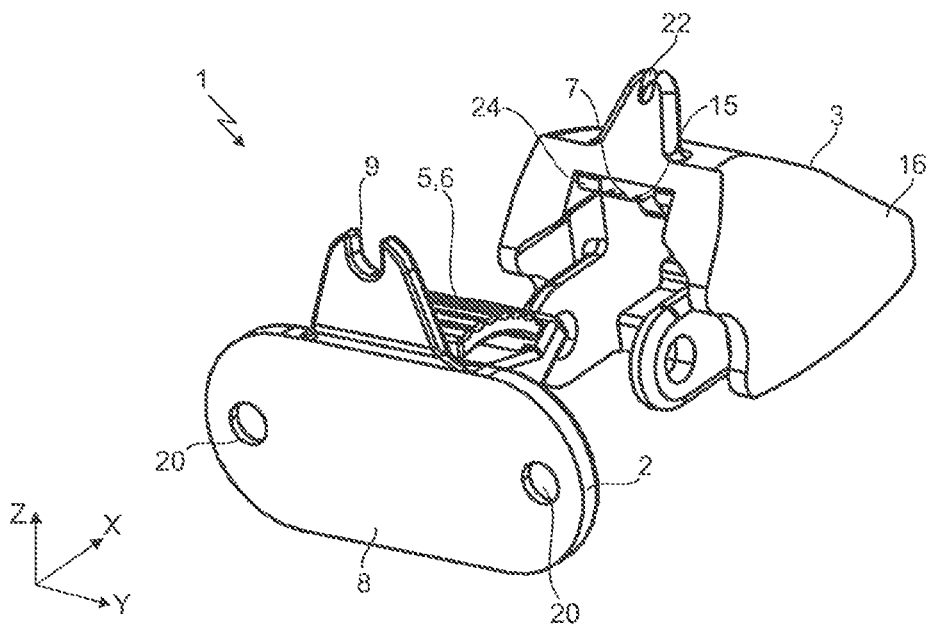
FIG. 2 is a rear view of a control element according to an embodiment.
Figure 3A:
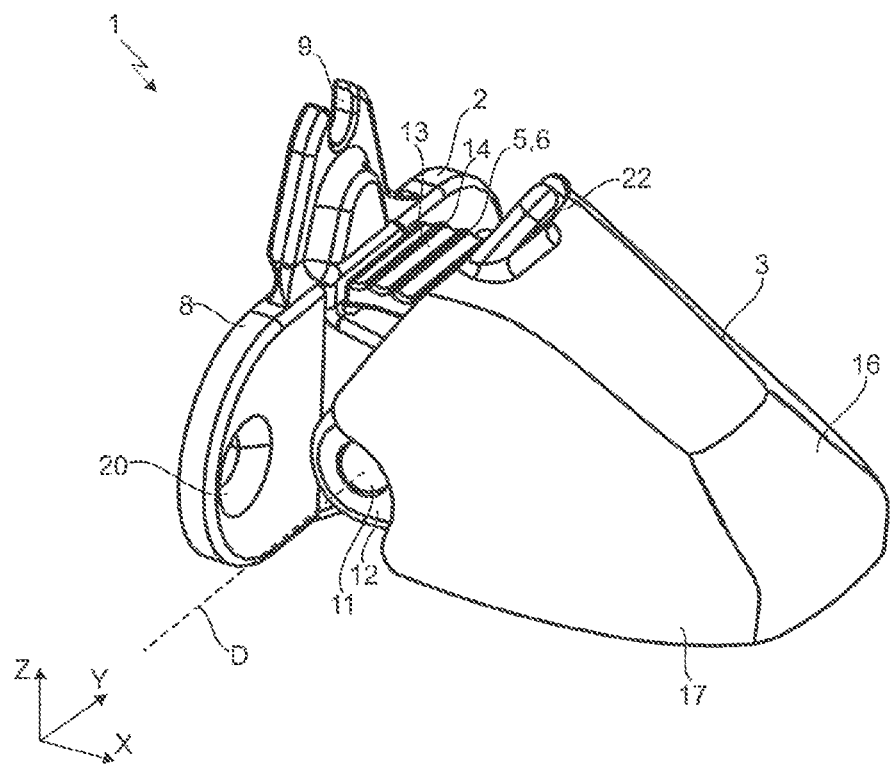
FIG. 3a, 3b are isometric views of a control element according to an embodiment in different positions.
Figure 3B:
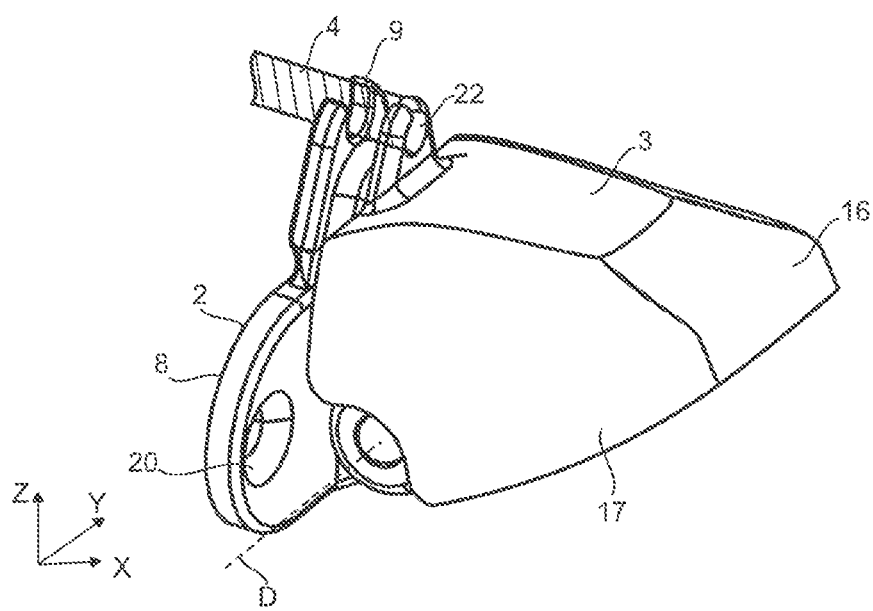
Figure 7:
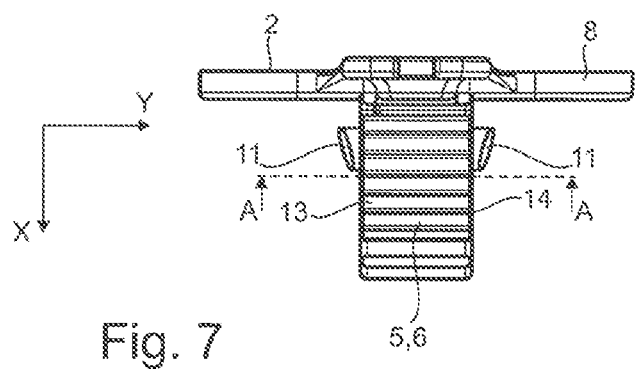
FIG. 7 is a top view of the first element according to an embodiment.
Figure 8:
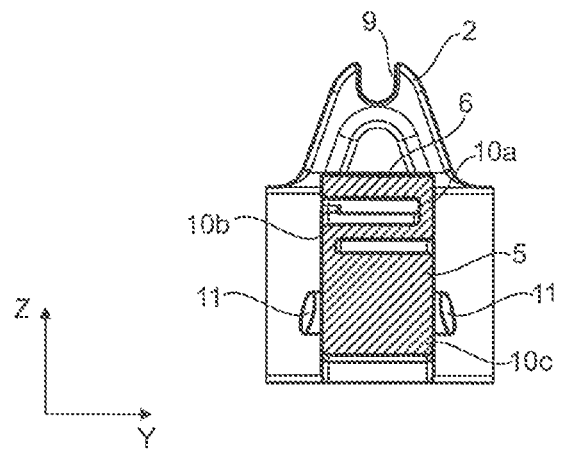
FIG. 8 is a sectional view along the sectional axis A-A from FIG. 7.

Two basic embodiments are shown in the drawings. In FIGS. 1 to 3 and 9 to 10c, an embodiment is shown in which the second element 3 comprises a cap-like portion 16 which at least in portions encloses the first latching element 6 and the spring element 5. At this cap-like portion 16, gripping surfaces 17 are provided, at which the user can grip the control element 1 and carry out a corresponding movement of the second element 3. An exploded view of this embodiment is shown in FIG. 1. FIG. 2 shows a rear view of this embodiment. In FIG. 3a, the control element is shown in a lower position. The receptacle 22 is positioned here at a maximum distance from the first element 2 or the through opening 9. The inner cable of the Bowden cable 4 is thus also moved (out) by a maximum path relative to the cable casing. An upper position of the control element 1 is shown in FIG. 3b. The distance between the receptacle 22 and the first element 2 is minimal here.

The second element 3 is shown in FIGS. 4a and 4b. It can be seen that the second latching element 7 is designed as an arm element 24, on the underside of which a plurality of latching cams is arranged. The arm element 24 is advantageously designed in an arcuate manner. The arm element 24 can protrude at least partially from the cap-like portion.

The embodiment according to FIGS. 1 to 3 and 9 to 10c has the advantage that only two components are provided for the entire control element 1.

In FIGS. 11 to 14, a grip cap 18 is provided which is arranged on the second element 3. Gripping surfaces 20 are provided on the grip cap 18, on which the user can grip the control element 1 and carry out a corresponding movement of the second element 3. In the two embodiments, the first element 2, shown for example in FIGS. 5a to 7, is substantially the same. The advantage of this embodiment is that the appearance of the control element 1, which is substantially defined by the gripping surfaces, can be customised. The components relevant for the function, in the form of the first element 2 and the second element 3, can, however, be produced substantially in the same way.

The gripping surfaces 17 of the embodiment according to FIGS. 1 to 3 and 9 to 10c and the gripping surfaces 20 of the embodiment according to FIGS. 11 to 14 can have haptic coatings and/or protective coatings. Haptic elements and/or identification elements can be arranged on the gripping surfaces 17, 20. Furthermore, luminescent or luminous elements can be provided on the gripping surfaces 17, 20.

In FIGS. 11 to 14, a lever arm 19 is provided on which the grip cap 18 is arranged. Furthermore, a snap connection 23 is provided which comprises at least one projection 23a, preferably two projections 23a. The two projections 23a are provided on the opposite lateral sides of the second element 3 along the horizontal direction Y. The projection 23a engages in an opening 23b of an arm on the grip cap 18.

Figure 11:
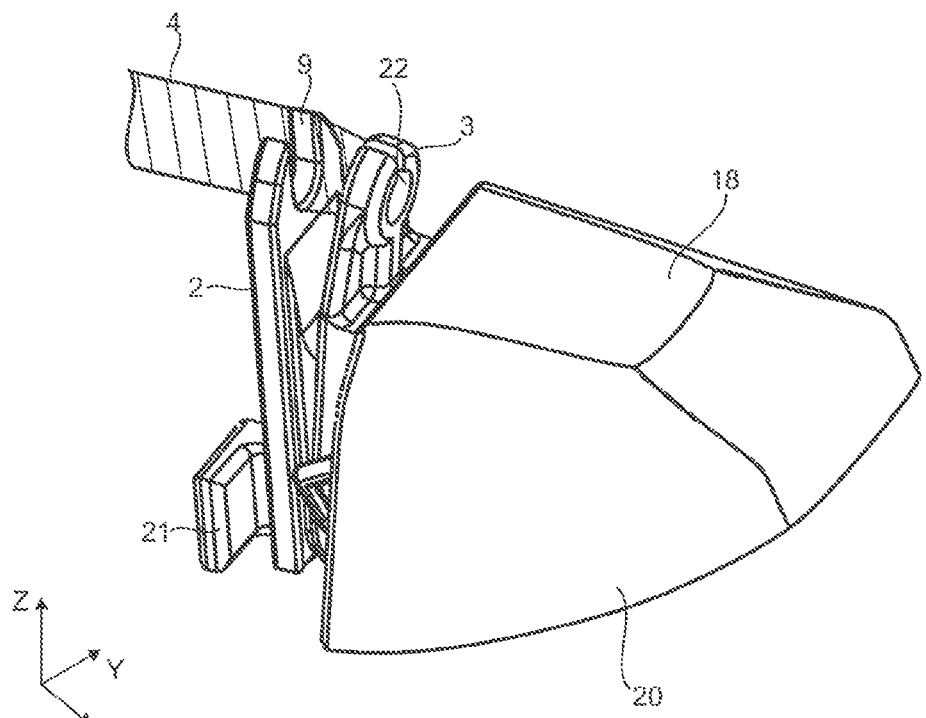
FIG. 11 is an isometric view of a control element according to an embodiment.
Figure 13:
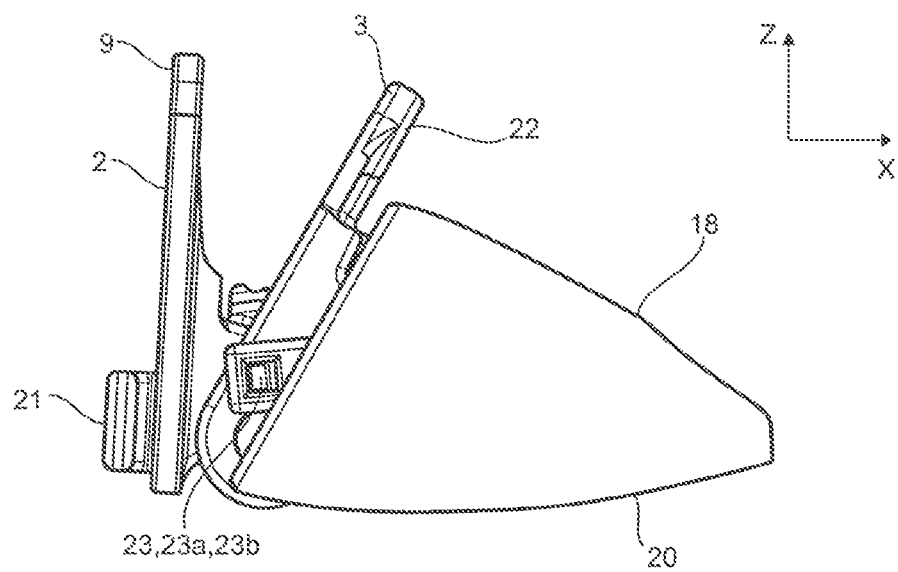
FIG. 13 is a side view of the control element according to an embodiment.

An upper position of the control element 1 is shown in FIG. 11. The distance between the receptacle 22 and the first element 2 is minimal here. In FIG. 13, the control element 1 is shown in a lower position. The receptacle 22 is positioned here at a maximum distance from the first element 2 or the through opening 9. The inner cable of the Bowden cable 4 is thus also moved (out) by a maximum path relative to the cable casing.

Figure 12:
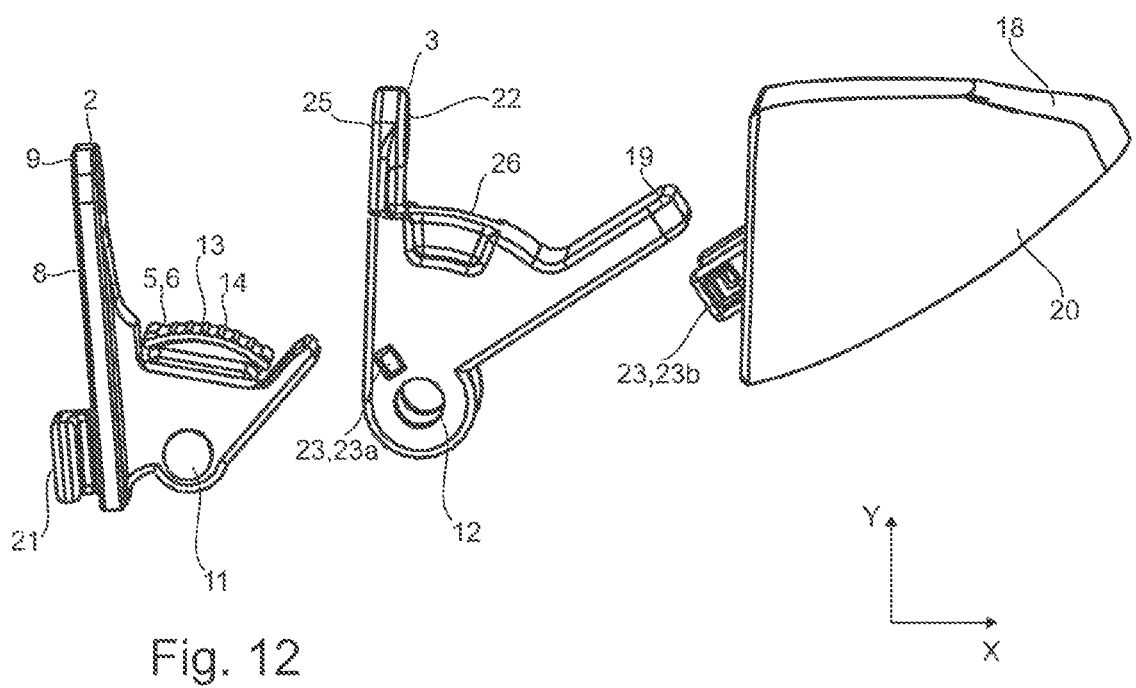
FIG. 12 is an exploded view of a control element according to an embodiment.

An exploded view of the control element 1 is shown in FIG. 12. It can be seen that the second element 3 is designed in a V-like manner. At the lower end along the vertical axis Z, two arms with the receptacles 12 are provided. At the upper end along the vertical axis Z, the lever arm 19 and an arm 25 on which the receptacle 22 for the Bowden cable is arranged are provided. The arm 25 and the lever arm 19 open into a base portion 26. This base portion 26 is arranged at least in portions along the vertical axis Z above the first latching element 5. The second latching element 7 is arranged on an underside of the base portion 26 and extends towards the first latching element 2.

The lever arm 19 is part of a lever length 27 which starts from the axis of rotation D. This is clearly visible in FIG. 15c. Even if no explicit lever arm 19 is provided in the embodiment according to FIGS. 1 to 3 and 9 to 10c, a substantially identical lever length 27 can be achieved through the configuration of the cap-like portion 16. This is clearly visible in FIG. 10c. The lever length 27 can be used to determine the force to be applied by the user, which is necessary to release the engagement of the latching cams 15 from the latching grooves, or to release the latching between the first latching element 6 and the second latching element 7. The adjusting force is also influenced by the height of the latching steps 14 and the preload.

Figure 9:
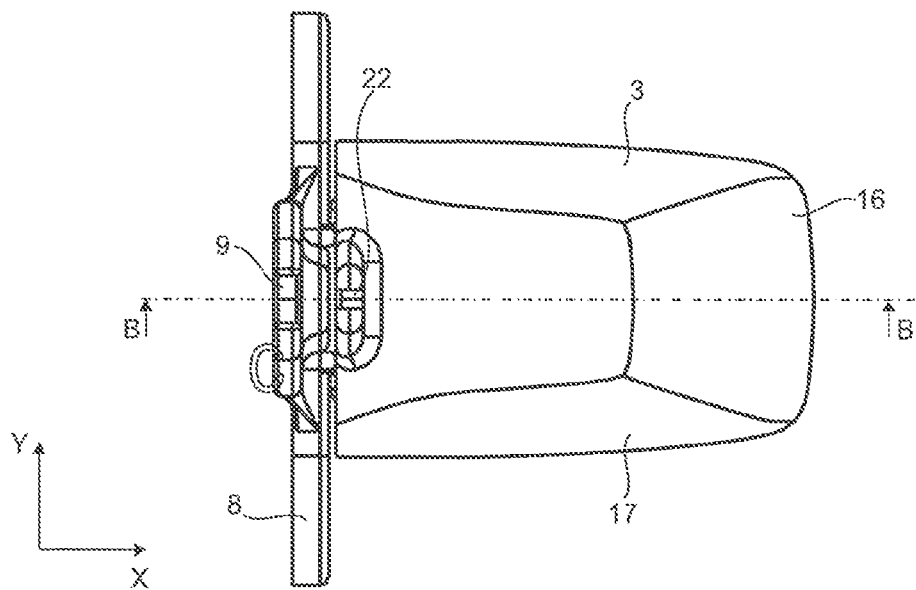
FIG. 9 is a top view of the control element according to an embodiment.
Figure 10A:
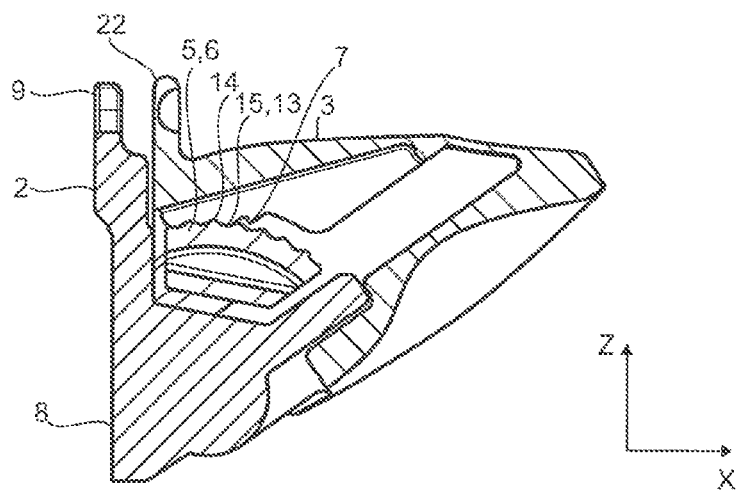
FIGS. 10a to 10c are sectional views along the sectional axis B-B from FIG. 9.
Figure 10B:
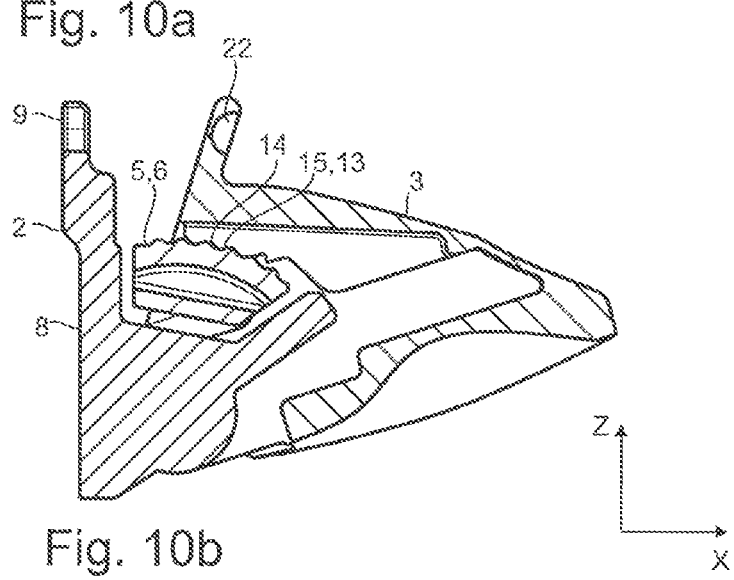
Figure 10C:
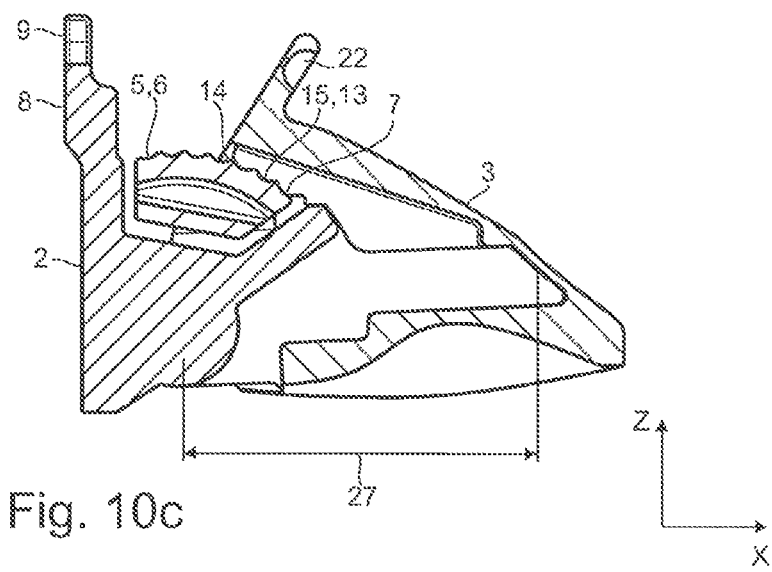
Figure 14:
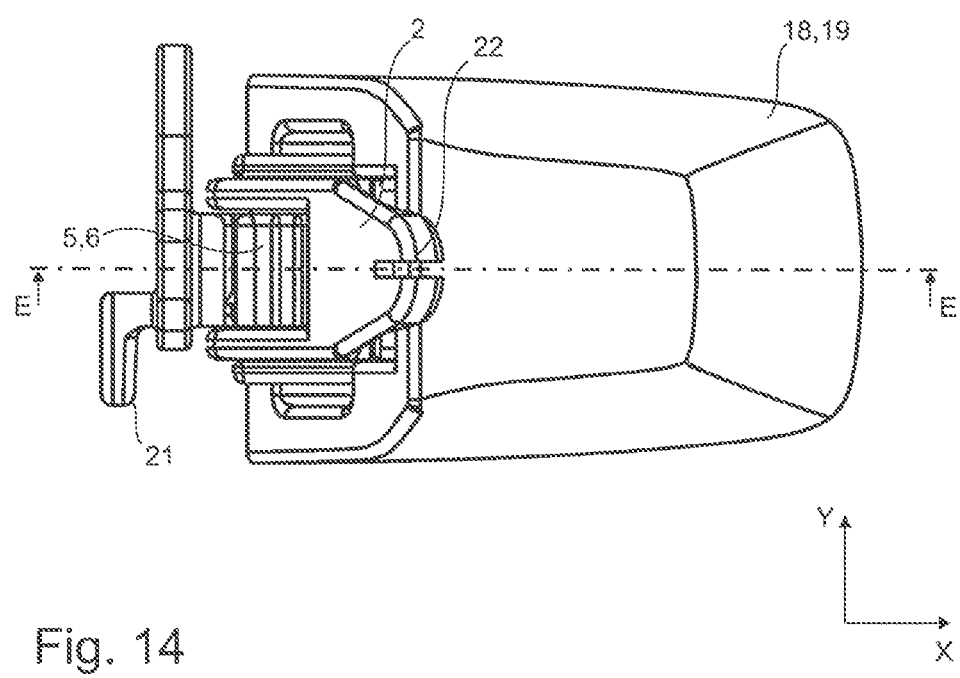
FIG. 14 is a top view of the control element according to an embodiment.
Figure 15A:
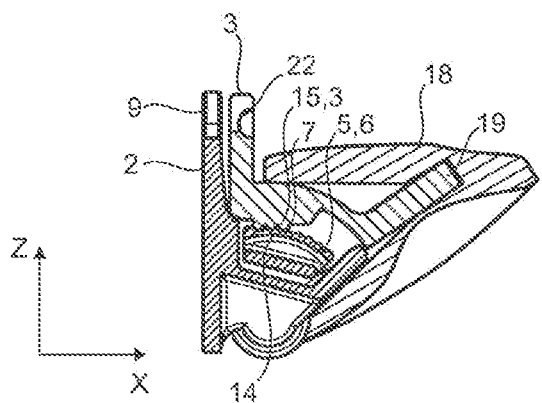
FIGS. 15a to 15c are sectional views along the sectional axis E-E from FIG. 16.
Figure 15B:
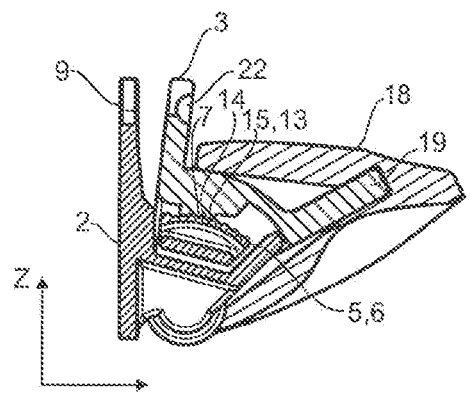
Figure 15C:
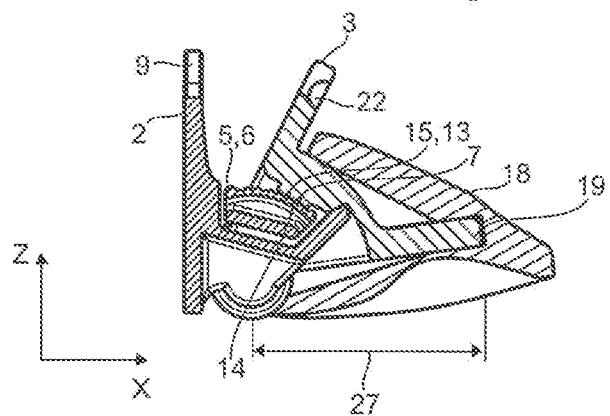

A section along the axis B-B in FIG. 9 is shown in FIGS. 10a to 10c. A section along the axis E-E from FIG. 14 is shown in FIGS. 15a to 15c. In these sectional views, the respective control element is shown in different positions. FIGS. 10a to 10c and 15a to 15c are described in parallel below since the corresponding arrangements are analogous.

There are 3 latching cams 15 provided, which each engage in 3 latching grooves. The latching cams lie parallel to the latching grooves along the horizontal axis Y. The additional S-shaped configuration of the spring element 5 allows for a defined bending axis of the spring element 5 over the entire adjustment path along the first latching element 5. A constant adjusting force is thus obtained over the entire adjustment path. With the present embodiments, the spring element 5 is uniformly deformed when a vertical force is applied.

An upper position of the control element 1 is shown in FIG. 10a, 15a. The distance between the receptacle 22 and the first element 2 is minimal here. In FIG. 10b, 15b, a middle position of the control element 1 is shown. In FIGS. 10c and 15c, the control element 1 is shown in a lower position. The receptacle 22 is positioned here at a maximum distance from the first element 2 or the through opening 9. The inner cable of the Bowden cable 4 is thus also moved (out) by a maximum path relative to the cable casing. The adjustment angle in this construction is in a range between 0° and 32.5°. 3 additional latching steps can be perceived between the top and bottom positions. The adjustment angle and the latching steps can be extended or shortened as required, depending on the position of the upper and lower stop.

Figure 16:
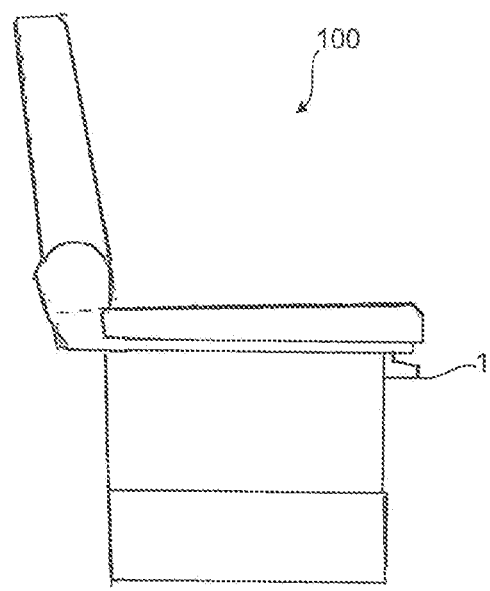
FIG. 16 is a side view of a vehicle seat with a control element according to an embodiment.

FIG. 16 shows a vehicle seat 100 on which a control element 1 is arranged. The control element can in principle be arranged at any accessible point on the vehicle seat. Accordingly, the invention is not limited to the illustrated arrangement position.

All features disclosed in the application documents are claimed as being substantial to the invention, provided that they are, individually or in combination, novel over the prior art.

LIST OF REFERENCE SIGNS 1 control element
2 first element
3 second element
4 Bowden cable
5 spring element
6 first latching element
7 second latching element
8 plate-like base portion
9 through opening for the Bowden cable
10 arc of curvature
10b arc of curvature
11 guide projections
12 receptacles for the guide projections
13 latching grooves
14 latching steps
15 latching cams
16 cap-like portion
17 gripping surface
18 grip cap
19 gripping surface
20 bores
21 hook-like elements
22 receptacle for Bowden cable
23 snap connection 23
23a, b projection
23b opening
24 arm element
25 arm
26 base portion
27 lever length
D axis of rotation
Z vertical axis
X longitudinal axis
Y horizontal axis

What is claimed is:

1. A control element for a vehicle seat, comprising:
a second element which is arranged to be movable relative to a first element, wherein the second element is connected to a Bowden cable and is lockable relative to the first element,
wherein the control element comprises a spring element on which a first latching element is provided,
wherein the first latching element presses against a second latching element through a spring force of the spring element, whereby the first latching element and the second latching element latch, wherein the first element and the spring element are formed in one piece and the second latching element is arranged on the second element, or the second element and the spring element are formed in one piece and the second latching element is arranged on the first element, wherein the first latching element has a plurality of latching grooves, wherein the first latching element has a convex curvature along a vertical axis, and wherein the latching grooves are separated by latching steps.

2. The control element according to claim 1, wherein the first element has a plate-shaped base portion, by means of which the first element can be arranged on the vehicle seat, and wherein a through opening for the Bowden cable is provided on the plate-shaped base portion.

3. The control element according to claim 2, wherein the first element and the spring element consist of a plastics material, wherein the first element and the spring element consist of the same plastics material, and wherein the first element and the spring element are produced by an injection molding process.

4. The control element according to claim 2, wherein the spring element is a curved spiral spring and/or leaf spring, wherein the spring element has at least two arcs of curvature, and wherein the spring element has an S-shaped profile.

5. The control element according to claim 2, wherein the second element is arranged on the first element to be rotatable about an axis of rotation, wherein the axis of rotation extends along a horizontal axis and extends along a vertical axis below the first latching element, wherein two guide projections are arranged on the first element, which each extend along the horizontal axis and are each arranged in a receptacle on the second element, and wherein the Bowden cable is attached to the second element in such a way that an inner cable of the Bowden cable is moved by a rotary movement of the second element about the axis of rotation.

6. The control element according to claim 2, wherein a grip cap can be arranged on the second element, wherein the second element comprises a lever arm extending from an axis of rotation, wherein the grip cap can be arranged on the lever arm, wherein at least one gripping surface is provided on the grip cap, wherein haptic coatings and/or protective coatings are applied to the at least one gripping surface, wherein haptic elements are arranged on the at least one gripping surface, wherein identification elements are arranged on the at least one gripping surface, and wherein luminescent or luminous elements are arranged on the at least one gripping surface.

7. The control element according to claim 1, wherein the first element and the spring element consist of a plastics material, wherein the first element and the spring element consist of the same plastics material, and wherein the first element and the spring element are produced by an injection molding process.

8. The control element according to claim 7, wherein the spring element is a curved spiral spring and/or leaf spring, wherein the spring element has at least two arcs of curvature, and wherein the spring element has an S-shaped profile.

9. The control element according to claim 7, wherein the second element is arranged on the first element to be rotatable about an axis of rotation, wherein the axis of rotation extends along a horizontal axis and extends along a vertical axis below the first latching element, wherein two guide projections are arranged on the first element, which each extend along the horizontal axis and are each arranged in a receptacle on the second element, and wherein the Bowden cable is attached to the second element in such a way that an inner cable of the Bowden cable is moved by a rotary movement of the second element about the axis of rotation.

10. The control element according to claim 7, wherein a grip cap can be arranged on the second element, wherein the second element comprises a lever arm extending from an axis of rotation, wherein the grip cap can be arranged on the lever arm, wherein at least one gripping surface is provided on the grip cap, wherein haptic coatings and/or protective coatings are applied to the at least one gripping surface, wherein haptic elements are arranged on the at least one gripping surface, wherein identification elements are arranged on the at least one gripping surface, and wherein luminescent or luminous elements are arranged on the at least one gripping surface.

11. The control element according to claim 1, wherein the spring element is a curved spiral spring and/or leaf spring, wherein the spring element has at least two arcs of curvature, and wherein the spring element has an S-shaped profile.

12. The control element according to claim 11, wherein the spring element has two arcs of curvature.

13. The control element according to claim 11, wherein the second element is arranged on the first element to be rotatable about an axis of rotation, wherein the axis of rotation extends along a horizontal axis and extends along a vertical axis below the first latching element, wherein two guide projections are arranged on the first element, which each extend along the horizontal axis and are each arranged in a receptacle on the second element, and wherein the Bowden cable is attached to the second element in such a way that an inner cable of the Bowden cable is moved by a rotary movement of the second element about the axis of rotation.

14. The control element according to claim 11, wherein a grip cap can be arranged on the second element, wherein the second element comprises a lever arm extending from an axis of rotation, wherein the grip cap can be arranged on the lever arm, wherein at least one gripping surface is provided on the grip cap, wherein haptic coatings and/or protective coatings are applied to the at least one gripping surface, wherein haptic elements are arranged on the at least one gripping surface, wherein identification elements are arranged on the at least one gripping surface, and wherein luminescent or luminous elements are arranged on the at least one gripping surface.

15. The control element according to claim 1, wherein the second element is arranged on the first element to be rotatable about an axis of rotation, wherein the axis of rotation extends along a horizontal axis and extends along a vertical axis below the first latching element, wherein two guide projections are arranged on the first element, which each extend along the horizontal axis and are each arranged in a receptacle on the second element, and wherein the Bowden cable is attached to the second element in such a way that an inner cable of the Bowden cable is moved by a rotary movement of the second element about the axis of rotation.

16. The control element according to claim 15, wherein the second latching element has at least one latching cam which engages in a first subset of latching grooves, wherein the engagement of the at least one latching cam is releasable from the first subset of latching grooves by a rotary movement of the second element about the axis of rotation and is displaceable to a second subset of latching grooves, wherein a haptic and/or acoustic feedback can be specified by a height of the latching steps.

17. The control element according to claim 16, wherein both in an engaged position and in a released position, the first latching element and the second latching element are aligned parallel along the horizontal axis, and wherein the at least one latching cam and the first subset of latching grooves are aligned parallel along the horizontal axis both in an engaged position and in a released position.

18. The control element according to claim 1, wherein the second element comprises a cap-shaped portion, which at least in portions encloses the first latching element and the spring element, wherein at least one gripping surface is provided on the cap-shaped portion, wherein haptic coatings and/or protective coatings are applied to the at least one gripping surface, wherein haptic elements are arranged on the at least one gripping surface, wherein identification elements are arranged on the at least one gripping surface, and wherein luminescent or luminous elements are arranged on the at least one gripping surface.

19. The control element according to claim 1, wherein a grip cap can be arranged on the second element, wherein the second element comprises a lever arm extending from an axis of rotation, wherein the grip cap can be arranged on the lever arm, wherein at least one gripping surface is provided on the grip cap, wherein haptic coatings and/or protective coatings are applied to the at least one gripping surface, wherein haptic elements are arranged on the at least one gripping surface, wherein identification elements are arranged on the at least one gripping surface, and wherein luminescent or luminous elements are arranged on the at least one gripping surface.

20. A vehicle seat comprising a control element according to claim 1.

* * * * *